(No Model.)

G. D. BURTON.
SPITTOON FOR RAILROAD CARS AND SIMILAR PLACES.

No. 272,206. Patented Feb. 13, 1883.

Witnesses
Fred A. Powell
W. H. Syston

Inventor
Geo. D. Burton

UNITED STATES PATENT OFFICE.

GEORGE D. BURTON, OF NEW IPSWICH, NEW HAMPSHIRE.

SPITTOON FOR RAILROAD-CARS AND SIMILAR PLACES.

SPECIFICATION forming part of Letters Patent No. 272,206, dated February 13, 1883.

Application filed December 27, 1882. (No model.)

*To all whom it may concern:*

Be it known that I, GEORGE D. BURTON, of New Ipswich, county of Hillsborough, State of New Hampshire, have invented an Improvement in Spittoons for Railroad-Cars and Similar Places, of which the following description, in connection with the accompanying drawings, is a specification, like letters on the drawings representing like parts.

My invention relates to a spittoon for railroad-cars or steamboats or places of similar nature, in which the bowl or receptacle, open at top and bottom, is set in the floor, its top being flush therewith, and has a movable cover or valve closing its lower end, operated by a handle extending up through the floor, so that the spittoon can be emptied and cleaned without removing it.

The present invention consists in the construction of the valve and mechanism for operating it. The periphery of the lower opening of the receptacle is turned to a sharp edge, and the valve is provided with a flexible annular washer fitted to the said edge, so that when pressed against the bottom of the receptacle it closes it tightly. The valve is pivoted loosely on an arm extending from the lower portion of the bowl, the said arm also forming a fulcrum for a lever, one end of which is connected by a link with the valve, and the other end with the handle that passes up through the floor, so that by raising the handle the valve is lowered, thus opening the bottom of the receptacle, and by depressing the handle the valve is pressed into close contact with the bottom of the receptacle, perfectly closing it. The handle, when pressed down, engages by a suitable shoulder a portion of the metal which forms the handle-socket, and is thus locked in its depressed position, with the valve held tightly against the bottom of the receptacle. The length of the handle is made adjustable, so that the valve may always be pressed tightly as the parts wear away. By having the valve pivoted loosely it always comes to a bearing at the bottom of the receptacle, the link by which it is pressed acting at the middle of the valve.

Figure 1:
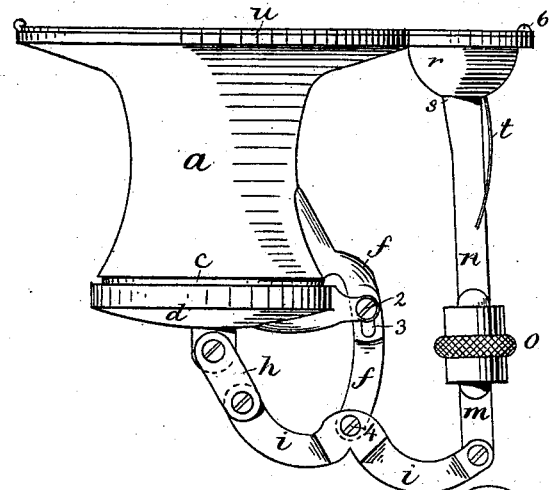
Figure 2:
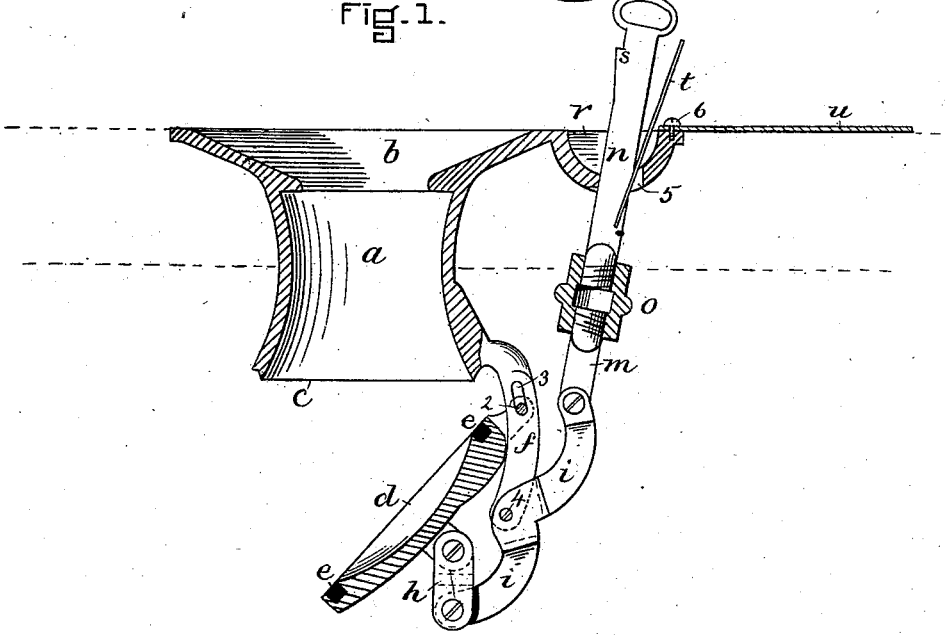

Figure 1 is a side elevation of a spittoon embodying this invention, it being shown as closed, ready for use; Fig. 2, a vertical section thereof, being shown as open for discharging its contents and cleaning.

The main portion $a$ or receptacle is provided at its upper end with a flaring opening, $b$, and at its lower end with a sharp seat, $c$, to receive the valve or bottom piece, $d$, provided with an annular washer, $e$, of rubber or other yielding material. The bottom piece, $d$, is pivoted at 2 in an arm, $f$, extending downward from the lower portion of the receptacle $a$, the said arm being slotted, as at 3, to permit the bottom piece, $d$, to move slightly toward and from its seat at $c$ without rocking on its pivot, to thus enable it to bear uniformly on its seat all around. The bottom piece is connected by a link, $h$, with one end of a lever, $i$, pivoted at 4 on the arm $f$, the other end of the said lever being connected with a handle consisting of two portions, $m$ $n$, connected by a right-and-left-threaded nut, $o$, by which its length may be adjusted as occasion requires. The upper end of the portion $n$ of the handle passes through an opening, 5, in the handle portion $r$, recessed to receive the handle at the side of the upper portion of the receptacle $a$, which is intended to be laid in flush with the floor. (Shown in dotted lines, Fig. 2.) The portion $n$ of the handle is provided with a shoulder, $s$, which, when it is in its lowest position, is thrown by the spring $t$ into engagement with the under side of the handle-recess $r$, thus retaining the said handle in its lowest position and the bottom piece, $d$, pressed against its seat, as shown in Fig. 1.

The amount of pressure of the piece $d$ against its seat can be regulated by changing the length of the handle $m$ $n$ by means of the nut $o$.

The upper end of the spittoon is provided with a cover, $u$, pivoted at 6.

I claim—

1. The combination, with the receptacle, open at top and bottom and provided with an arm extending from its lower portion, of the bottom piece or valve loosely pivoted in the said arm, the lever pivoted on the said arm, link connecting the said lever and valve, and handle for actuating the said lever, substantially as described.

2. The receptacle, open at top and bottom and provided with a sharp seat, combined with the valve having a washer for the said seat, its operating-lever, and actuating-handle adjustable in length and provided with a locking-shoulder, substantially as described.

In testimony whereof I have signed my name to this specification in the presence of two subscribing witnesses.

GEO. D. BURTON.

Witnesses:
  JOS. P. LIVERMORE,
  BERNICE J. NOYES.